United States Patent
Balachandran

(10) Patent No.: US 9,898,280 B2
(45) Date of Patent: Feb. 20, 2018

(54) AUTOMATIC CODE REVIEW AND CODE REVIEWER RECOMMENDATION

(71) Applicant: VMware, Inc., Palo Alto, CA (US)

(72) Inventor: Vipin Balachandran, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/941,693

(22) Filed: Nov. 16, 2015

(65) Prior Publication Data
US 2016/0070568 A1 Mar. 10, 2016

Related U.S. Application Data

(63) Continuation of application No. 13/734,943, filed on Jan. 5, 2013, now Pat. No. 9,201,646.

(51) Int. Cl.
*G06F 9/45* (2006.01)
*G06F 9/44* (2006.01)

(52) U.S. Cl.
CPC ............... *G06F 8/71* (2013.01); *G06F 8/43* (2013.01); *G06F 8/70* (2013.01); *G06F 8/75* (2013.01)

(58) Field of Classification Search
CPC .......... G06F 11/3604; G06F 11/3612; G06F 2221/033; G06F 11/3624; G06F 8/75; G06F 11/3664; G06F 11/3688; G06F 8/71
See application file for complete search history.

(56) References Cited

U.S. PATENT DOCUMENTS

| | | | |
|---|---|---|---|
| 7,240,332 B2 | 7/2007 | Berg et al. | |
| 8,069,169 B2 * | 11/2011 | Fitzpatrick | G06F 17/30867 707/732 |
| 8,713,532 B2 | 4/2014 | Gogh et al. | |
| 8,856,725 B1 | 10/2014 | Anderson et al. | |
| 8,893,088 B2 * | 11/2014 | Overbeck | G06F 9/44547 717/124 |
| 9,626,283 B1 * | 4/2017 | Zlatnik | G06Q 10/06 |

(Continued)

OTHER PUBLICATIONS

Uwano et al.Analyzing individual performance of source code review using reviewers' eye movement.Proceedings of the 2006 symposium on Eye tracking research & applications pp. 133-140. Retrieved on [Sep. 25, 2017] Retrieved from the Internet: URL< http://dl.acm.org/citation.cfm?id=1117357>.*

(Continued)

*Primary Examiner* — Thuy Dao
*Assistant Examiner* — Cheneca Smith

(57) ABSTRACT

Systems and methods for managing review of source code are described. The method may comprise receiving a version of source code that includes a specific change at a specific location in the version of source code that has been affected by one or more programming actions compared to a prior version of source code; and identifying a plurality of prior review requests associated with the specific change. The method may comprise assigning corresponding review points to the plurality of prior review requests; and based on the corresponding review points, selecting a code reviewer from a plurality of code reviewers who each have created or processed a subset of the plurality of prior review requests. The method may further comprise generating a review request for the specific change in the version of source code for processing by the selected code reviewer.

18 Claims, 5 Drawing Sheets

(56) References Cited

U.S. PATENT DOCUMENTS

| | | |
|---|---|---|
| 2005/0015675 A1 | 1/2005 | Kolawa et al. |
| 2006/0200803 A1 | 9/2006 | Neumann et al. |
| 2008/0295085 A1 | 11/2008 | Rachamadugu et al. |
| 2008/0320436 A1 | 12/2008 | Hughes |
| 2009/0044177 A1 | 2/2009 | Bates et al. |
| 2009/0249299 A1 | 10/2009 | Farchi et al. |
| 2009/0300580 A1 | 12/2009 | Heyhoe et al. |
| 2009/0311658 A1* | 12/2009 | Polivka .................... G09B 5/00 434/350 |
| 2010/0030626 A1 | 2/2010 | Hughes et al. |
| 2011/0173693 A1 | 7/2011 | Wysopal et al. |
| 2012/0331440 A1* | 12/2012 | Meermeera ............... G06F 8/36 717/101 |
| 2013/0007704 A1 | 1/2013 | Haynes et al. |
| 2013/0326467 A1* | 12/2013 | Nair .................... G06F 11/3664 717/101 |
| 2014/0137072 A1* | 5/2014 | Hey, Jr. .......... G06Q 10/063112 717/101 |
| 2014/0196010 A1 | 7/2014 | Balachandran |

OTHER PUBLICATIONS

Ayewah et al. Using Static Analysis to Find Bugs. IEEE Software, vol. 25, Issue: 5, Sep.-Oct. 2008, Retrieved on [Sep. 25, 2017] Retrieved from the Internet: URL<http://ieeexplore.ieee.org/stamp/stamp.jsp?arnumber=4602670>.*

* cited by examiner

AUTOMATIC CODE REVIEW AND CODE REVIEWER RECOMMENDATION

CROSS REFERENCE TO RELATED APPLICATION

The present application is a continuation application of U.S. patent application Ser. No. 13/734,943, filed Jan. 5, 2013 and entitled "Automatic Code Review and Code Reviewer Recommendation." The aforementioned U.S. Patent Application, including any appendices or attachments thereof, is hereby incorporated by reference in its entirety.

BACKGROUND

Code review is the examination of source code for mistakes overlooked by the code's author. Code review is an important procedure for improving the overall quality of software and is cost-effective because it is less expensive to find and fix mistakes before they become part of a product. Nonetheless, existing code review techniques are inefficient because they: 1) allow the code reviewers to treat all types of source code mistakes equally or ignore some of the coding standard violations; and 2) lack a systematic way to assign appropriate code reviewers.

Existing code review procedures are inefficient because they ask code reviewers to treat coding standard violations and logic mistakes equally or ignore some of these coding standard violations. Coding standard violations are deviations from a set of guidelines for a specific programming language that primarily prescribe a programming style. In contrast, logic errors are mistakes in a program that causes it to operate incorrectly. While coding standard mistakes can be easily detected by automated tools, logic mistakes are more easily detected by experienced code reviewers. Asking code reviewers to focus on both types of mistakes is time-consuming and wasteful.

Existing code review techniques are also inefficient because they don't systematically select the appropriate code reviewer for a particular software module. The appropriate reviewer is someone who is familiar with the software module—typically the module's owner or his peer. Assigning reviewers who are unfamiliar with the module is inefficient because the reviewer faces a steep learning curve and could be error-prone since the reviewer may conduct a less accurate review.

SUMMARY

Systems and methods for performing automatic code review are described. The system receives a version of source code and processes it for potential coding issues based on a code review configuration. Upon detecting a coding issue, the system generates an automatic code review that contains a location identifying the coding issue in the version of source code and an associated review comment selected from the code review configuration. The method includes receiving a version of source code and generating a review request for a specific change in the version of source code. The method then assigns a code reviewer for handling the review request by selecting a reviewer from a subset code reviewers based on the number of times each code reviewer has been assigned to prior review requests associated with the specific change.

DETAILED DESCRIPTION

Figure 1:
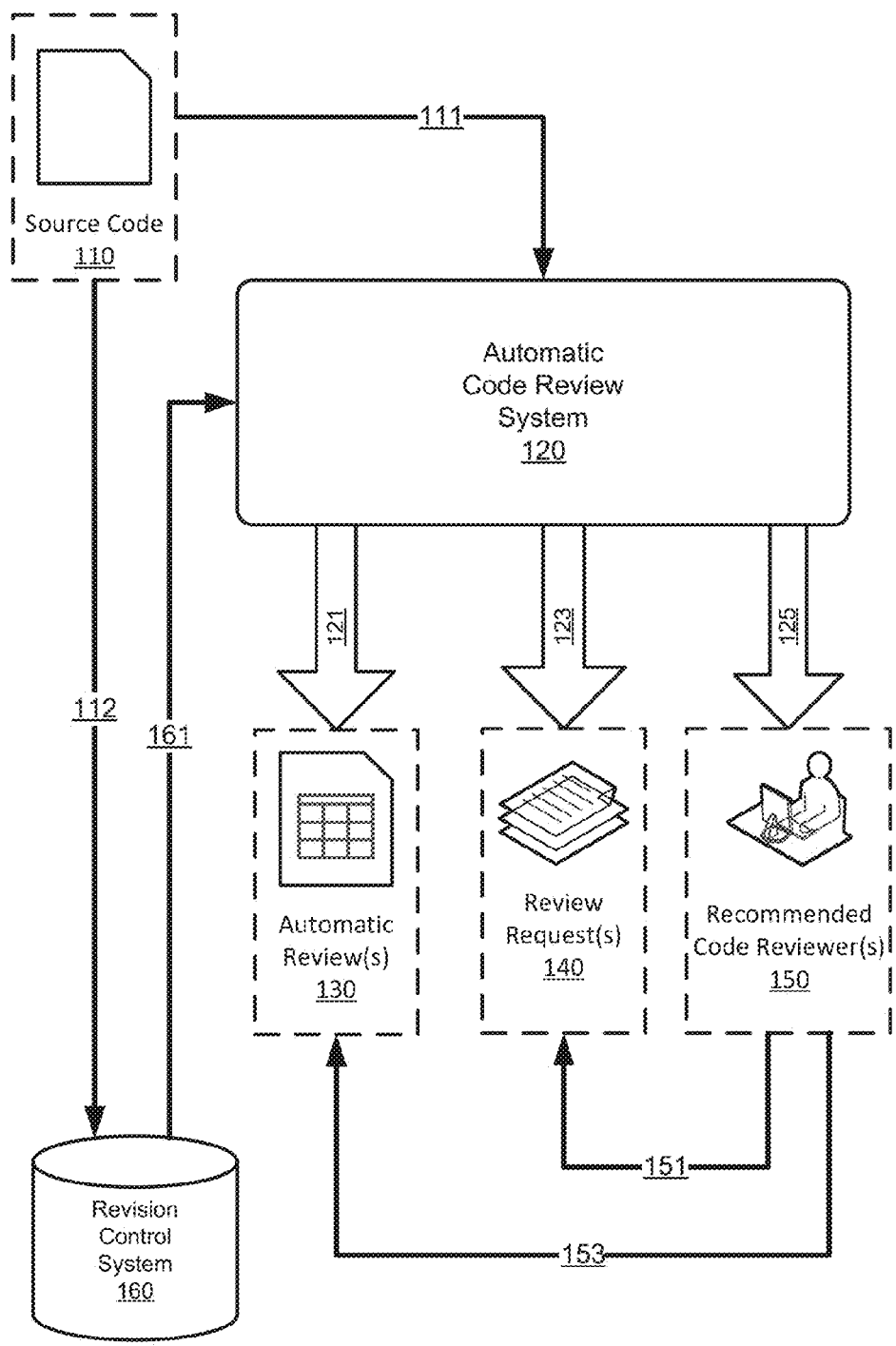
FIG. 1 illustrates a code reviewing environment configured to provide automatic code review and code reviewer recommendation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

As noted above, code reviewers examine source code for two main categories of mistakes: 1) coding standard violations; and 2) logic errors. An automatic code review system can use static analysis tools to analyze the source code for the first category of mistakes as well as common defect patterns. Supplementing the manual code review process with an automatic code review system allows the human code reviewer to pay more attention to the second category of mistakes thereby improving the human code reviewer's productivity and resulting in better quality software programs. Further, the automatic code review system may utilize a reviewer recommendation algorithm to identify the appropriate human code reviewers to handle a specific review request.

Throughout the present disclosure, the term "coding standard" may refer to a text document which states the coding conventions to be followed in a natural language (English). An administrator of the automatic code review system may create a "code review configuration" based on a coding standard. A code review configuration may contain, without limitation, any of the following elements: (i) rules to enable for different static analysis modules (e.g., Checkstyle may have support for 500 rules, out of which 120 is needed to detect issues related to coding standard violations), (ii) rule setting, wherein some rules may be configured with a user defined parameter (e.g., the coding standard may indicate that the number of public methods in a class should not exceed 20, and the PMD rule to detect this may take in as input the number 20), (iii) custom rule messages (e.g., certain times the messaged emitted by the static analysis modules may be cryptic, and it may need to be overridden by a more readable message taken from the coding standard), and (iv) rule code to section number mapping.

FIG. 1 illustrates a code reviewing environment configured to provide automatic code review and code reviewer recommendation according to some embodiments. In FIG. 1, a software developer may submit 111 a version of source code 110 to an automatic code review system 120 before committing the source code 110 to a revision control system 160. The automatic code review system 120 may process the source code 110 for any defects and/or problematic issues, and generate an automatic review 130 that records the detected defects and issues. The automatic code review system 120 may also generate a review request 140, and/or recommend one or more human code reviewers 150. The developer may fix the defects and issues in the source code 110 based on the automatic review 130. The code reviewers 150 may perform additional code reviewing on the source code ∠based on the review request 140. Upon resolving all the coding issues by the developer, the code reviewers 150 may sign-off on the source code 110, allowing the source code 110 to be committed 112 to the revision control system 160.

In one embodiment, the source code 110 may be a piece of software programming code which can be used to build a software program. The source code 110 may be newly drafted or an update to an existing version of the source code 110. The source code 110 may be self-complete (including all components necessary to build the software program), or be a portion of a software project. The source code 110 may be version-based (containing a single version of source code), or diff-based (containing the differences between two different versions of a corresponding piece of source code). Some examples of the source code 110 may include Java® source code, C/C++ source code, C#® source code, or any other software code.

In a "code review process", after a developer finished drafting a piece of source code 110, he may submit a "review request" seeking one or more code reviewers to review the source code 110 and provide additional opinions. A "code reviewer" may be a human or a system that is capable of checking the source code 110 for any coding issues. In some cases, the code reviewer may be the developer who drafted the source code 110. The developer code reviewer may review the coding issues identified by the automatic code review system 120 and listed in the automatic review 130. In other cases, the code reviewer may be a person other than the developer, and is assigned to perform the code reviewing task. A "coding issue" may be a defect (e.g., a bug) which may cause a software program to malfunction, or a programming issue which may affect the performance or the development of the software program.

Upon receiving a review request, one or more code reviewers may analyze the source code 110 for any potential coding issues. If a coding issue is detected, the code reviewers may record the coding issue and his comment in a "review", and transmit the review to the developer. The developer may update the source code 110 based on the review, and re-submit the updated source code 110 under the same review request for another round of code review process. If the code reviewers are satisfied with the changes to the source code 110, the source code 110 may be approved for storing to a source code storage system (e.g., a revision control system 160).

In one embodiment, the revision control system 160 may be a stand-alone or distributed system for performing revision control (also known as version control and source control) to the source code 110. The revision control system 160 may automate the storing, retrieving, logging, identifying, and merging of different revisions of the source code 110. Exemplary revision control system 160 may include, without limitation, CVS, RCS, Perforce®, and any other commercial or non-commercial software. A source code 110 may be "committed" to the revision control system 160, which in turn assigns a new and unique revision number to the source code 110. The committed version of source code 110 may be stored along with all previous revisions of the source code 110, and may be retrieved based on its revision number. To reduce coding issues, it is ideal to perform code review before committing a source code 110 to the revision control system 160.

In one embodiment, the automatic code review system 120 may be integrated into a code reviewing process by automating some of the code review operations described above. Specifically, the automatic code review system 120 may extract 161 a prior revision of the source code 110 from the revision control system 160, compare the prior revision with the source code 110 to detect the changes, and automatically detect some or all of the coding issues that are associated with the changes and/or in the source code 110, without requiring the involvement of a human code reviewer. Alternatively, human code reviewers may be assigned to further review the coding issues found by the automatic code review system 120 and to look for other logical errors which cannot be detected by automatic review.

In one embodiment, the automatic code review system 120 may automatically detect various types of coding issues, including defects such as class design problems, duplicated code, possible bugs, or bug patterns (an error code idiom, e.g., double checked locking). The coding issues that can be automatically detected may also include dead code, suboptimal code, overcomplicated expressions, or stylistic issues such as violations of naming conventions or coding disciplines. The automatic code review system 120 may further generate 121 an automatic review 130 to identify and explain the detected coding issues. The details of the detecting of the coding issues and the generating of the automatic review 130 are further described below.

In one embodiment, the automatic code review system 120 may identify one or more changes in the source code 110 that may require further analysis by a human code reviewer. For example, the source code 110 may include a new piece of logic, which on its surface, does not contain any coding issues. The automatic code review system 120 may generate 123 a review request 140 based on the one or more changes. The automatic code review system 120 may also recommend 125 one or more code reviewers 150 that are suitable for reviewing the automatic review 130 as well as the review request 140. In one embodiment, a developer may submit multiple pieces of source code (e.g., multiple source code files) as a batch of source code 110 to the automatic code review system 120. The automatic code review system 120 may generate an automatic review 130 which contains coding issues found in the batch of source code 110, and a review request 140 for reviewing the batch of source code 110.

In one embodiment, a developer may evaluate the automatic review 130, and make updates to the source code 110 in order to fix the coding issues identified in the automatic review 130. Afterward, the developer may submit the updated source code 110 to the automatic code review system 120, which may process the updated source code 110 and generate a new automatic review 130 for any newly founded or unfixed coding issues. The above process may be repeated until the developer fixed all the coding issues identified by the automatic code review system 120, or chose to ignore some of the coding issues. The automatic code review system 120 may then incorporate the changes to the source code 110 in a single review request 140 to be evaluated by the recommended code reviewers 150. The recommended code reviewers 150 may evaluate the automatic reviews 130, as well as the changes made to the source code 110. Some of the changes may be for fixing the coding issues. The other changes may be unrelated to fixing issues reported by automatic review. For example, a new section of code containing a bug, which is not found by automatic review, can be a change that should be reviewed by a human reviewer. Upon approval of the source code 110, the recommended code reviewers 150 may sign-off on the source code 110, and the developer 110 may commit the source code 110 to the revision control system 160.

Figure 2:
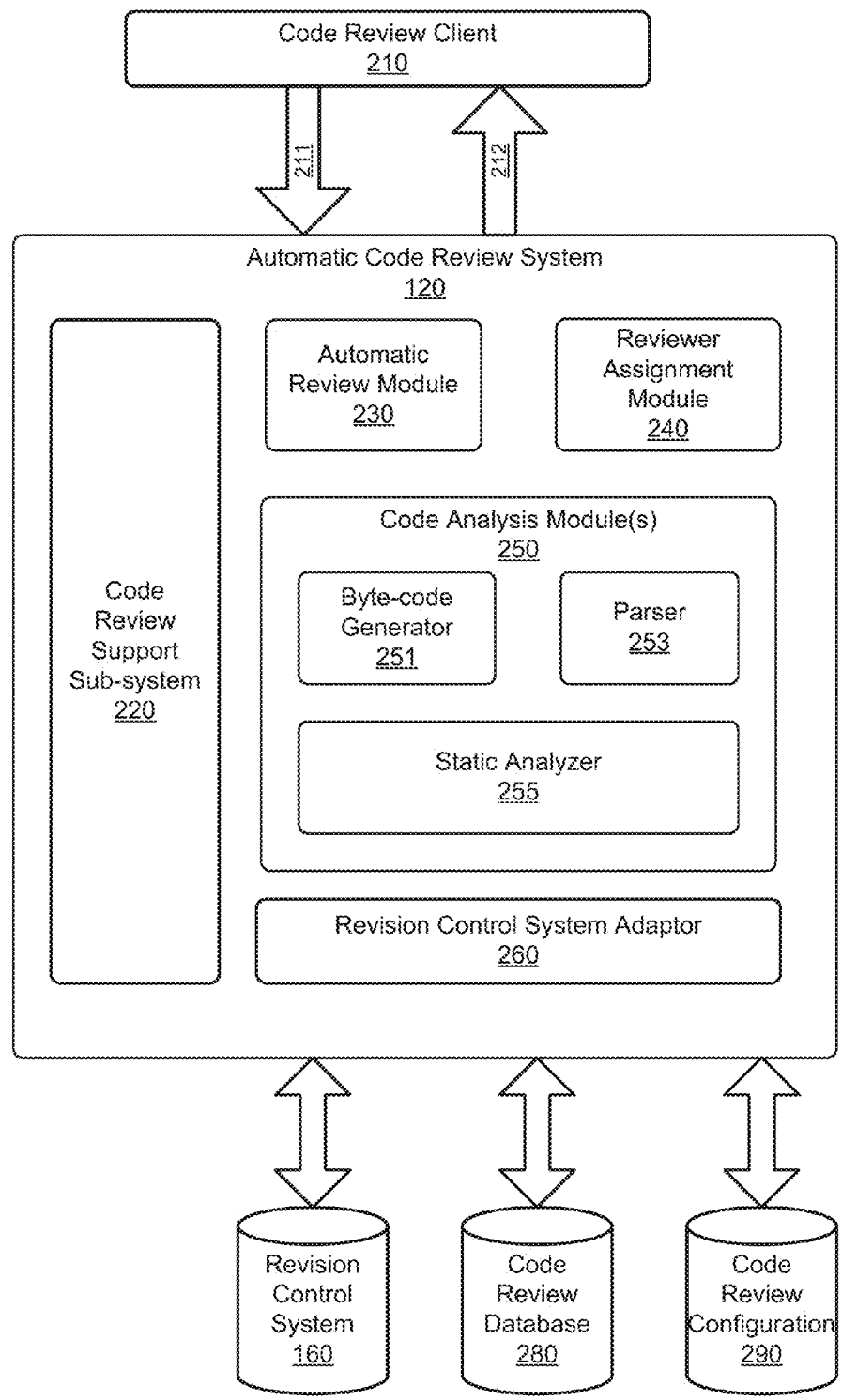
FIG. 2 illustrates an automatic code review system configured to provide automatic code review and code reviewer recommendation.

FIG. 2 illustrates an automatic code review system configured to provide automatic code review and code reviewer recommendation, according to some embodiments of the present disclosure. In FIG. 2, the automatic code review system 120, which may correspond to the automatic code review system 120 of FIG. 1, may be configured to contain, among other modules, a code review support sub-system 220, an automatic review module 230, a reviewer assignment module 240, and one or more code analysis modules 250. The automatic code review system 120 may be configured to access a revision control system 160, which may correspond to revision control system 160 of FIG. 1. The automatic code review system 120 may be configured to utilize a code review configuration 290, and be accessed by a code review client 210. The automatic code review system 120 may further be configured with a code review database 280 and the code review configuration 290. The automatic code review system 120 may be implemented as a computer system (not shown in FIG. 2), which may include CPU, memory, and other hardware components. Alternatively, the automatic code review system 120 may be a software system installed on the computer system.

In one embodiment, the code review client 210 may include a user interface allowing a human code reviewer to perform code reviewing operations. The code review client 210 may allow the human code reviewer to review the automatic reviews and review requests, which are generated by the automatic code review system 120 and stored in the code review database 280. Further, the code review client 210 may provide an administrative user interface to support project-specific configurations of the various modules (e.g., modules 230, 240, and 250). For example, the administrative user interface may configure the automatic review module 230 by enabling/disabling static analyzer 255's checks and rules, modifying the rule settings and messages emitted by the static analyzer 255, and/or mapping rules to relevant sections in the code review configuration 290. The code review client 210 may be a software program running on a computer system, or a web-based application that allows access via a network.

In one embodiment, the code review support sub-system 220 may provide functions to manage the various elements of a code review process. For example, the code review support sub-system 220 may support the creating and updating of review requests and code reviewers, as well as the tracking of coding issues and reviews. The review requests and reviews may be stored and retrieved from the code review database 280. In one embodiment, the code review support sub-system 220 may be a web-based system that supports REST (REpresentation State Transfer) API, and the review requests may be encoded in JSON or XML formatted data objects. The automatic code review system 120 may be connected to the code review support sub-system 220 through the REST API built using Jersey library.

In one embodiment, the automatic code review system 120 may be a stand-alone java application that utilizes, enhances, and extends the functionalities provided by the code review support sub-system 220. The automatic review module 230 of the automatic code review system 120 may perform the automated reviewing of the source code, which is otherwise performed by a human code reviewer utilizing the code review support sub-system 220. Specifically, the automatic review module 230 may utilize one or more code analysis modules 250 having functionalities for checking various coding issues. For example, the automatic review module 230 may utilize a first code analysis module 250 to check for coding standard violations in the source code, a second code analysis module 250 to scan source code for design problems, and/or a third code analysis module 250 to process source code for logic errors.

In one embodiment, the code analysis module 250 may contain a static analyzer 255 similar to Checkstyle, PMD, or FindBugs. The specific static analyzer 255 may process inputs in byte-code format, while the source code is in text-format. In this case, the automatic review module 230 may utilize a byte-code generator 251 to generate corresponding byte code or object code based on the text-formatted source code. When a piece of source code depends on additional resources that are located in other source files, it may not be possible to compile only the source code to generate the necessary byte code or object code. Thus, the byte-code generator 251 may build a source code environment that contains not only the source code, but also the required additional resources retrieved from the revision control system 160. In order words, the source code environment may be similar to a workspace environment the developer used when drafting the source code. Afterward, the source code may be built in the source code environment in order to generate the byte code corresponding to the source code.

In one embodiment, the additional resources that are needed for building the byte code may have multiple revisions. In this case, the byte-code generator 251 may identify the correct versions of the additional resources, in order to make sure the build is successful. Since a prior version of source code is usually committed to the revision control system 160 with the additional resources, the source code and the additional resources being assigned with a common revision number, it is feasible to use the common revision number to determine the correct revisions of the additional resources for the source code environment.

In one embodiment, the code analysis module 250 may also contain a parser 253 for parsing the results generated by the static analyzer 255. Since different static analyzers 255 may generate results in different formats, the parser 253 that is associated with a specific static analyzer 255 may convert the results of the specific static analyzer 255 to a common format, and extract coding issues from them. The automatic code review system 120 may optionally contain a cache (not shown in FIG. 2) to cache persistent and temporary data such as different revisions of source code, diff files, and/or configuration files. The cache may be implemented using a cache application such as Gem Fire.

In one embodiment, the automatic code review system 120 may contain a revision control system adapter 260 for interacting with a specific type of revision control system 160. For example, the revision control system adapter 260 may be a P4-LIB library adaptor to access a Perforce revision control system. Further, the automatic code review system 120 may utilize the code review configuration 290 for generating review comments. The code review configuration 290 may include coding issues and their associated review comments that can be incorporated into an automatic review.

In one embodiment, source code submitted to the automatic code review system 160 may be a "diff resource." A "diff resource" may be a file that contains differences between two revisions of the same source file, with added contents indicated by plus (+) signs and deleted contents indicated by minus (−) signs. An updated content between the two revisions of the same source file may be indicated by corresponding "deleted" contents and "added" contents in the diff resource. A "diff collection" may contain one or more "diff resources", each of which provides differences related to a specific created/updated file. For example, a diff collection may contain a first diff resource associated with a first file foo.java, and a second diff resource associated with a second file bar.java. A "code comment" may be a single comment made by a code reviewer and associated with a specific section of programming code in a diff resource. A "code review" may be a collection of code comments made by one or more code reviewers after reviewing a specific diff collection. A "review request" may be a request for the reviewing of one or more diff collections. The review request may be used to store one or more code reviews associated with the diff collections.

In one embodiment, the automatic review module 230 may perform automatic code review operations based on the pseudo code illustrated by the algorithm 1 of the following Table 1.

TABLE 1

Algorithm 1 AutoReview (id, rev, proj)

```
1:   // id:   Review Request ID
     // rev:  diff Collection revision
     // proj: project name
2:   ReviewRequest        req           = getReviewRequest(id)
3:   DiffCollection       diffCollection = req.getDiffCollection(rev)
4:   StaticAnalyzer[ ]    saArray       = getStaticAnalyzers(proj)
5:   List <SourceCodeIssue> codeIssues  = { };
6:
7:   for (DiffResource diffResource: diffCollection.getDiffResources( ))
     Do
8:       if (isFileTypeSupported(diffResource, proj)) then
9:           File f = getMergedFile(diffResource)
10:          for (StaticAnalyzer sa: saArray) do
11:              codeIssues.addAll(sa.check(f,proj))
12:      end for
13:      end if
14:   end for
15:
16:   Review review=createReview(req, codeIssues)
17:   review.publish( )
```

In Table 1, a procedure Auto Review may be invoked by the code analysis module 250 to perform an automatic code review operation on a review request (identified by the parameter id). The review request may seek to review a diff collection (identified by the parameter rev), which belongs to a certain project (identified by the parameter proj). In lines 2-3 of table 1, the automatic review module 230 may retrieve the review request from the code review support sub-system 220, and assign the retrieved review request to variable req. The automatic review module 230 may also retrieve a diff collection that is associated with the retrieved review request from the code review support sub-system 220, and assign the diff collection to variable diffCollection. At line 4, an array saArray is utilized to store one or more static analyzers 255 that are configured for processing the given project proj.

At line 7, one or more diff resources may be extracted from the diffCollection. Each diffResource in the one or more diff resources may be processed through a "for" loop in lines 7-14 by one or more static analyzers 255, in order to find any potential coding issues contained therein. The "if" statement in line 8 skips the processing of any file types that are not supported by the static analyzers. The getMergedFile function at line 9 is used to create a merged/patched file f by applying a specific diffResource to a baseline file to generate the file f. In other words, the diffResource may be generated by comparing the merged file f and the baseline file. Thus, the file f may represent a specific revision of source code corresponding to the specific diffResource. In one embodiment, the getMergedFile function may check whether the diffResource and the baseline file are already present in the cache of the automatic code review system 120. If the diffResource and/or the baseline file are not cached, the getMergedFile function may download the baseline file from the revision control system 160 via the revision control system adapter 260, download the diffResource from the code review support sub-system 220, and updates the cache accordingly.

At line 11, each of the static analyzer sa may check the file f for any coding issues, and all the coding issues detected by the static analyzers may be collected and stored in the list codeIssues. At line 16, the code analysis module 250 may generate a review for the detected codeIssues with corresponding information explaining the natures and the locations of the coding issues found in the diffCollection. For example, a specific static analyzer sa may generate a code issue result which includes the following fields: begin-line, end-line, message, priority, and/or rule-code, etc. The begin-line refers to the starting line, and the end-line refers to the ending line, in the source code file f where the source code issue is detected. The message may contain human readable description of the issue detected by the static analyzer. The rule-code is static-analyzer-specific. For example, a rule-code such as "JavaDocMethodCheck" may be a CheckStyle code corresponding to "Missing a Javadoc comment" in a method definition.

In one embodiment, an administrator may use the code review client 210 to configure a static analyzer 255 and map the results generated by the static analyzer 255 to sections in a certain coding standard, based on which the code review configuration 290 is developed. For example, the code review configuration 290 may include mapping of a rule-code of the static analyzer 255 to a standard section number in the coding standard, review messages, rules to enable, rule settings, and others. In other words, the coding standard may have standard section numbers that are associated with both the coding issues and the rule-codes of the static analyzer 255. The code review configuration 290 may also provide review comments for the coding issues. By using the code review configuration 290, the code analysis module 250 may generate a review (at line 16) that not only identifies the locations of the detected coding issues in the source code, but also provides the standard section numbers and instructions.

At line 17, the code analysis module 250 may publish the review to the code review support sub-system 220. Upon publication, the review may be stored in the code review database 280, and can be retrieved and viewed by other reviewers upon request. Further, after processing the source code through the code analysis module 250, the automatic code review system 120 may generate a review request for logical verification of the source code. In other words, after the code analytic modules 250's evaluation, the source code may still contain logic errors that require a human code reviewer to perform further checking. The generated review request, which may guide the human code reviewer to perform its reviewing activity, may be published to the code review support sub-system 220 and stored to the code review database 280.

In one embodiment, the automatic code review system 120 may generate the review request by including all the changes made to the source code since a last revision of the source code that is committed to the revision control system 160. The review request may also contain the automatic review as well as various review comments. Further, when a developer made updates to the source code based on review comments in the automatic review or based on review comments made by a code reviewer which has evaluated the source code following the review request, the new updates may also be included into the same review request, so that a subsequent code reviewer may see all changes and comments.

In one embodiment, the reviewer assignment module 240 may be used to recommend one or more appropriate code reviewers for reviewing a revision of source code. The reviewer assignment module 240 may choose code reviewers for recommendation based on the revision history of a specific change in the source code. A "specific change" in the source code may refer to a specific location (e.g., a specific section of code) in a revision of source code which has been affected by one or more programming actions (e.g., creating, updating, or deleting). The revision history of the specific change may be recorded in one or more prior review requests. Thus, the code reviewer(s) for recommendation may be selected from the creators of the prior review requests and/or prior code reviewers that have processed these prior review requests.

Once the reviewer assignment module 240 has ascertained the change history for a specific change, a corresponding "review point" may be assigned to the each of the prior review requests. The reviewer assignment module 240 may propagate the review points of the prior review requests, as "user points", to the code reviewers who have created or processed the prior review requests. The reviewer assignment module 240 may repeat the computation of change history and user-point assignment for all the specific changes in a diff resource and/or a diff collection. Afterward, reviewer assignment module 240 may rank the code reviewers based on their corresponding aggregated user points. And the reviewer assignment module 240 may recommend the top-ranked code reviewer(s) for handling the review request(s) generated by the automatic code review system 120.

In one embodiment, a specific change may be the context that is newly inserted into the source code. In this case, the newly inserted context (e.g., a new line) may not have associated prior review requests, since there are no review requests in the past which affected the new line. In this case, the reviewer assignment module 240 may make an assumption that the new line may be related to other contexts within the proximity of the new line. This assumption is more accurate for lines inserted in a method or lines corresponding to a new method, as all the lines in the same method are related, and the new method are often added to a place close to the related methods. Therefore, for inserted context, a nearest existing line in the source code may be used as a proxy for determining change history. In other words, the reviewer assignment module 240 may use the prior review requests of the nearest existing line (in lieu of the new line) for determining the code reviewer(s) for recommendation.

In one embodiment, the reviewer assignment module 240 may perform code reviewer recommendation based on the pseudo code illustrated by the algorithm 2 of the following Table 2.

TABLE 2

Algorithm 2 RankReviewers (id, rev)

```
1:   //id:  Review Request ID
     // rev: diff Collection revision
2:   ReviewRequest req       = getReviewRequest(id)
3:   DiffCollection diffCollection = req.getDiffCollection(rev)
4:   // Compute review request points
5:   for (DiffResource diffResource: diffCollection.getDiffResource( ))
     Do
6:       if (isNewFile(diffResource)) then
7:           continiue
8:       end if
9:       reqSet = { }
10:      for (Line l: diffResource.getLines( )) do
11:          lch = LCH(l)
12:          α = initialPoint(diffResource)
13:          for (ReviewRequest r: lch.history( )) do
14:              r.points = r.points + α
15:              α    = α * δ
16:              reqSet  = reqSet U {r}
17:          end for
18:      end for
19:  end for
20:  // Propagate review request points to user points
21:  userSet = { }
22:  for (ReviewRequest r: reqSet) do
23:      for (User user: r.getUsers( )) do
24:          user.points = user.points + r.points
25:          userSet   = userSet U {user}
26:      end for
27:  end for
28:  reviewers = Collections.toArray(userSet)
29:  Sort reviwers based on user points
30:  return reviewers
```

In Table 2, the reviewer assignment module 240 may invoke the procedure RankReviewers to operate on a review request (identified by the parameter id) associated with a diff collection (identified by the parameter rev). In lines 2-3 of Table 2, the reviewer assignment module 240 may retrieve the review request from the code review support sub-system 220, and assign the retrieved review request to variable req. The reviewer assignment module 240 may also retrieve a diff collection that is associated with the retrieved review request from the code review support sub-system 220, and assign the diff collection to variable diffCollection.

The reviewer assignment module 240 may utilize the for loop between lines 5-19 to compute the change history of each of the updated contents (e.g., lines) in the diffCollection, and assign review points to corresponding prior review requests. At the if statement of line 6, the reviewer assignment module 240 may skip the rest of the loop for diffResource corresponding to a new source code file, since there is no change history for contents in a new source code file. The variable reqSet is used to store the prior review requests which may be associated with the updated contents in the current diffResource, and is initialized at line 9. In the second for loop between lines 10-18, the reviewer assignment module 240 may iterate over each of the lines in the current diffResource, compute its change history, assign review points to the review requests found in the change history, and add the prior review requests to reqSet.

Specifically, at line 11, the reviewer assignment module 240 may compute the change history of the current line l and assigns to a variable lch. At line 12, the reviewer assignment module 240 may invokes the function initialPoint( ) which returns the initial review point that is to be assigned to the first prior review request in Ich. The function initialPoint( ) may return different initial review points for different types of files. For example, a Java file may have a higher initial review point than a XML file, as the Java file is deemed having a higher priority than the XML file. In the for loop between lines 13-17, the reviewer assignment module 240 may iterate, from the most recent prior review request to the least recent prior review request, over each of the prior review requests in the change history. At line 14, the reviewer assignment module 240 may assign the initial review point, which is based on the file type (e.g., JAVA type or XML type) associated with the diffResource, to the prior review request in the current iteration of the for loop. At line 15, the reviewer assignment module 240 may reduce the review point to be assigned to the following prior review request by a constant factor of $\delta$, where $0<\delta<1$. This will ensure that a more recent review request may have a higher review point than a less recent review request.

In lines 21-27, the reviewer assignment module 240 may propagate the review points assigned to the prior review requests in reqSet to any users who are associated with the prior review requests. For a specific prior review request, the "user" in Table 2 may refer to a creator of the prior review request and/or code reviewers that have worked on the prior review request. At line 21, the reviewer assignment module 240 may initialize the variable userSet for storing the set of users. In the for loop between lines 22-27, the reviewer assignment module 240 may iterate over each of the prior review requests in reqSet and assign review points of the prior review requests to the corresponding users as their user points. Finally, between lines 28-30, the reviewer assignment module 240 may sort all the identified users based on the descending order of the corresponding user points, and select a subset of the users as recommended code reviewers. Thus, the reviewer assignment module 240 may invoke the procedure RankReviewers and in return, receive the subset of the recommended code reviewers.

In one embodiment, the reviewer assignment module 240 may select the code reviewer that has the highest ranking (i.e., having the highest assigned user points) as a recommended code reviewer. Alternatively, the reviewer assignment module 240 may select the top 3 code reviewers in terms of their corresponding user points as recommended code reviewers. The reviewer assignment module 240 may either automatically assign the one or more recommended code reviewers to the automatically generated review request, or assist a developer who submits the review request by selecting the appropriate code reviewers from the recommended code reviewers.

Figure 3:
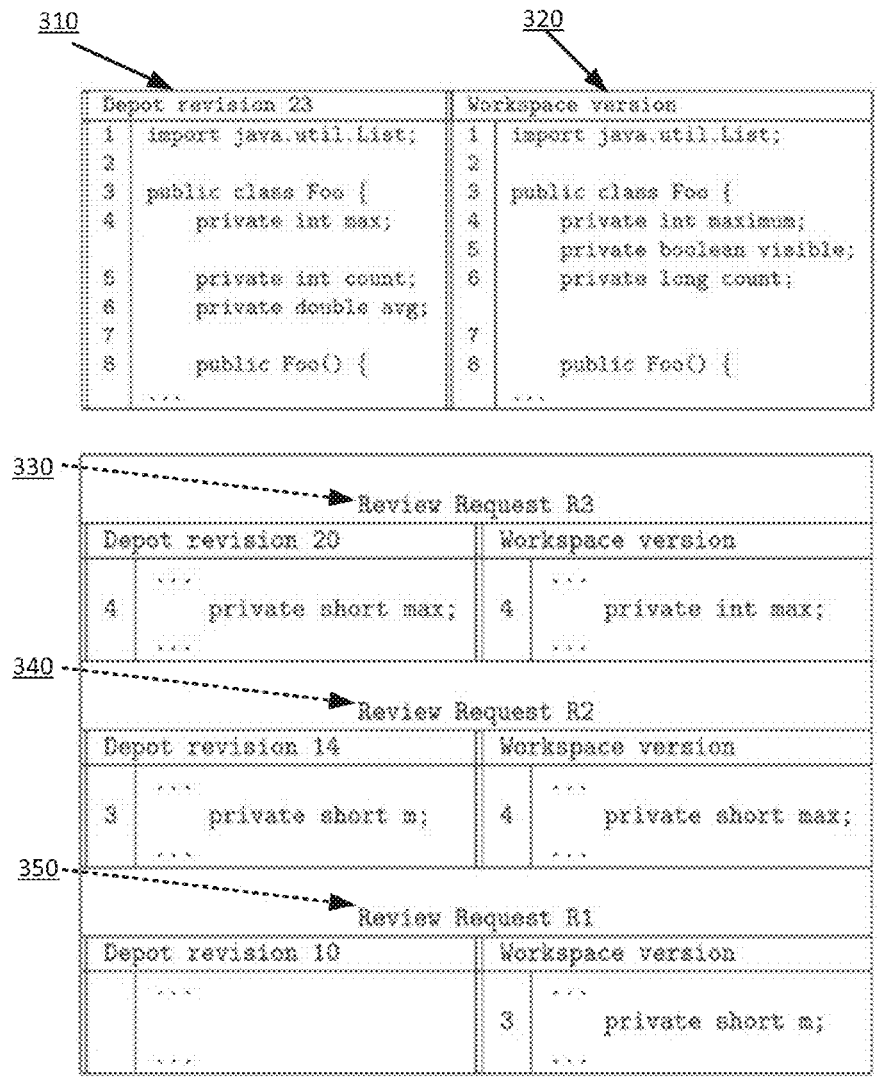
FIG. 3 illustrates prior review requests and code reviewer assessment.
Figure 3:
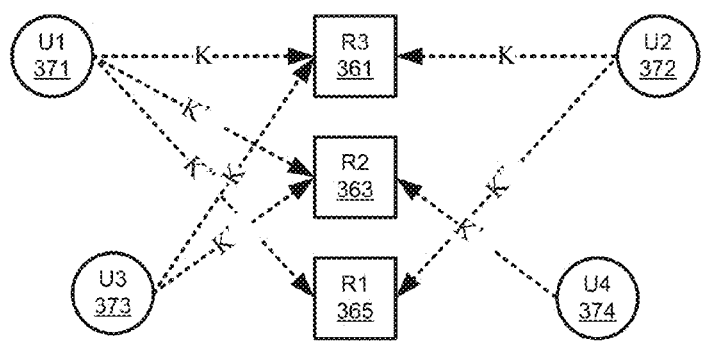

FIG. 3 illustrates prior review requests and code reviewer assessment, according to some embodiments. A depot version of a source code 310 is shown side-by-side with a workspace version 320 of the source code. The depot version 310 may be a prior revision of the source code that can be retrieved from a revision control system, while the workspace version 320 may be a current version of the source code located in a developer's programming environment. The reviewer assignment module 240 of FIG. 2 may compare these two versions 310 and 320 to determine that the developer has made multiple updates to the workspace version 320. For example, the developer may update line 4, add line 5, and update line 6 in version 320. Further, the developer may also delete a line, corresponding to line 6 of version 310, from version 320.

The reviewer assignment module may determine the history of a specific change in the source code by evaluating all prior review requests having programming actions that affected the specific location. There are three prior review requests 330, 340 and 350 that are associated with the specific change that affected line 3 or line 4 of the various revisions of the source code. The review request 350 (R1) may show that new context is added to line 3 based on depot revision 10; the review request 340 (R2) may show that context in line 4 is updated based on depot revision 14; and the review request 330 (R3) may show that context in line 4 is updated based on depot revision 20. In this case, the specific change may refer to the above related changes in these depot revisions. Thus, the history of the specific change may be shown by the list of prior review requests 330, 340, and 350.

In FIG. 3's example, the review requests 350, 340, and 330 are represented by three squares 365, 363, and 361 (denoted R1, R2, and R3, respectively), with R1 being prior to R2, and R2 being prior to R3. The code reviewers 371, 372, 373, and 374 (denoted U1, U2, U3, and U4, respectively) are represented by circles having lines pointing to one or more squares 365, 363, and/or 361. Each line is used to show that a specific developer/code reviewer may have worked on one of the prior review requests R1, R2 and R3. Based on the procedure RankReviewers shown in the above Table 2, the reviewer assignment module may assign a review point K ($\alpha$ in Table 2) to R3, which is the most recent review request. The reviewer assignment module may assign a review point $K'=K*\delta$ to R2, and assign a review initial point $K''=K*\delta*\delta$ to R1. Since $\delta<1$, $K>K'>K''$.

Since the code reviewer U1 has worked on review requests R1, R2, and R3, the reviewer assignment module may assign to U1 user points equaling $K+K'+K''$, which are review points propagated from the three review requests R3, R2 and R1. Likewise, the reviewer assignment module may assign to U2 user points equaling $K+K''$, which are review points propagated from the review requests R3 and R1. After calculating the user points for all the code reviewers U1, U2, U3, and U4, the reviewer assignment module may select the code reviewers that have high user points (e.g., U1) as the recommended code reviewer.

Figure 4:
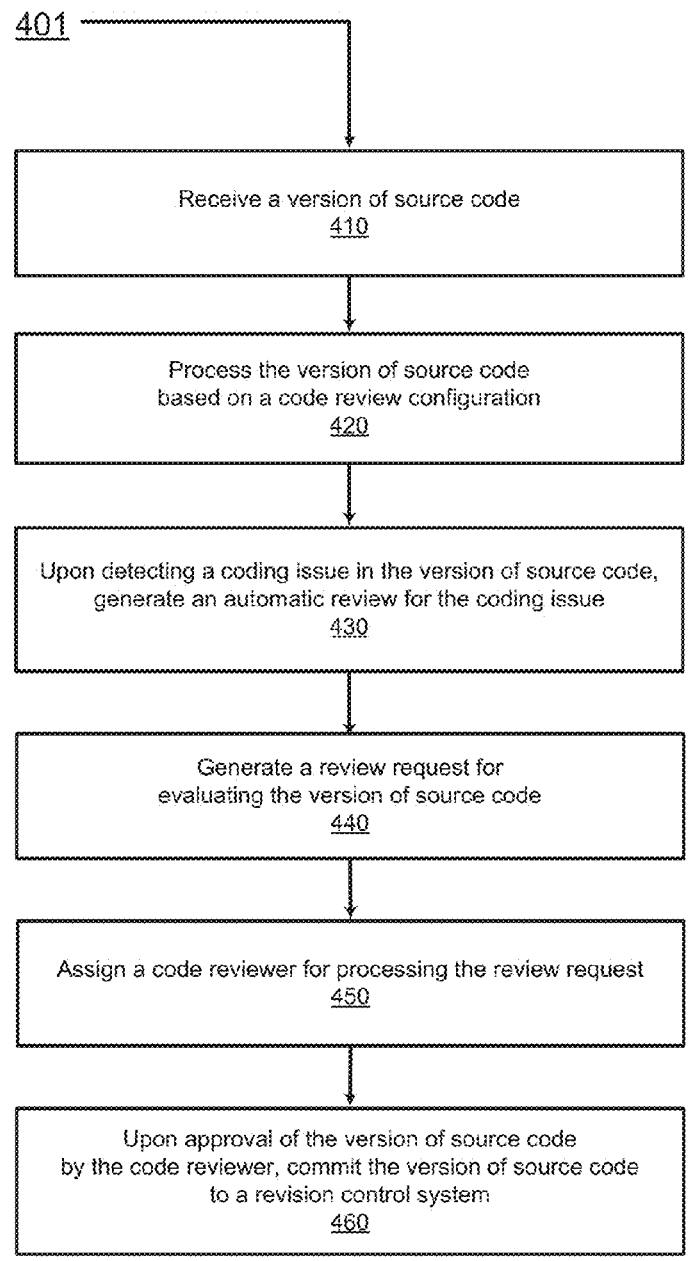
FIG. 4 shows a flow diagram illustrating one example process for implementing automatic code review.

FIG. 4 shows a flow diagram illustrating one example process 401 for implementing automatic code review, according to some embodiments of the present disclosure. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

At block 410, a software module running on a computer system may receive a version of the source code. The software module may be an automatic review module of an automatic code review system. In one embodiment, the software module may retrieve a source code environment associated with the version of source code from a revision control system. The source code environment may contain additional resources that can be used to build a byte code associated with the version of source code.

At block 420, the software module may process the version of source code for potential coding issues based on a code review configuration. The software module may utilize a code analysis module to process the version of source code. Specifically, the code analysis module may invoke a static analyzer to process the version of source code. For result obtained from the static analyzer, a parser of the code analysis module may extract one or more coding issues from the analytic outcome. In one embodiment, the software module may configure the static analyzer based on the code review configuration and the code review configuration, which supplies a list of rules for processing the version of source code.

In one embodiment, if a byte code is required by one of the code analysis module, the software module may generate a byte code corresponding to the version of source code by compiling the version of source code in the source code environment. Afterward, a static analyzer utilized by the code analysis module may process the byte code for the potential coding issues.

At block 430, upon detecting a coding issue in the version of source code, the software module may generate an automatic review for the coding issue using the code review configuration. The automatic review may contain a location identifying the coding issue in the version of source code and a review comment which is selected from the code review configuration, and is associated with the coding issue. The software module may publish the automatic review to a code review support system for a code reviewer to access.

At block 440, the software module may generate a review request for evaluating the version of source code. The review request may optionally contain the coding issue and the coding comment in the automatic review. At block 450, the software module may assign a code reviewer for processing the review request. In one embodiment, the code reviewer is selected based on the code reviewer's prior reviews of the version of source code. Specifically, the prior reviews of the version of source code include processing the prior review requests that are associated with the changes in the various prior versions of the source code, as described above. Thus, the code reviewer may be recommended by a reviewer assignment module of the automatic code review system.

At block 460, upon approval by the code reviewer after having processed the review request and evaluated the version of source code, the software module or the code reviewer may commit the version of source code to a revision control system. In this case, the version of source code may be deemed passed review and signed-off by the code reviewer.

Figure 5:
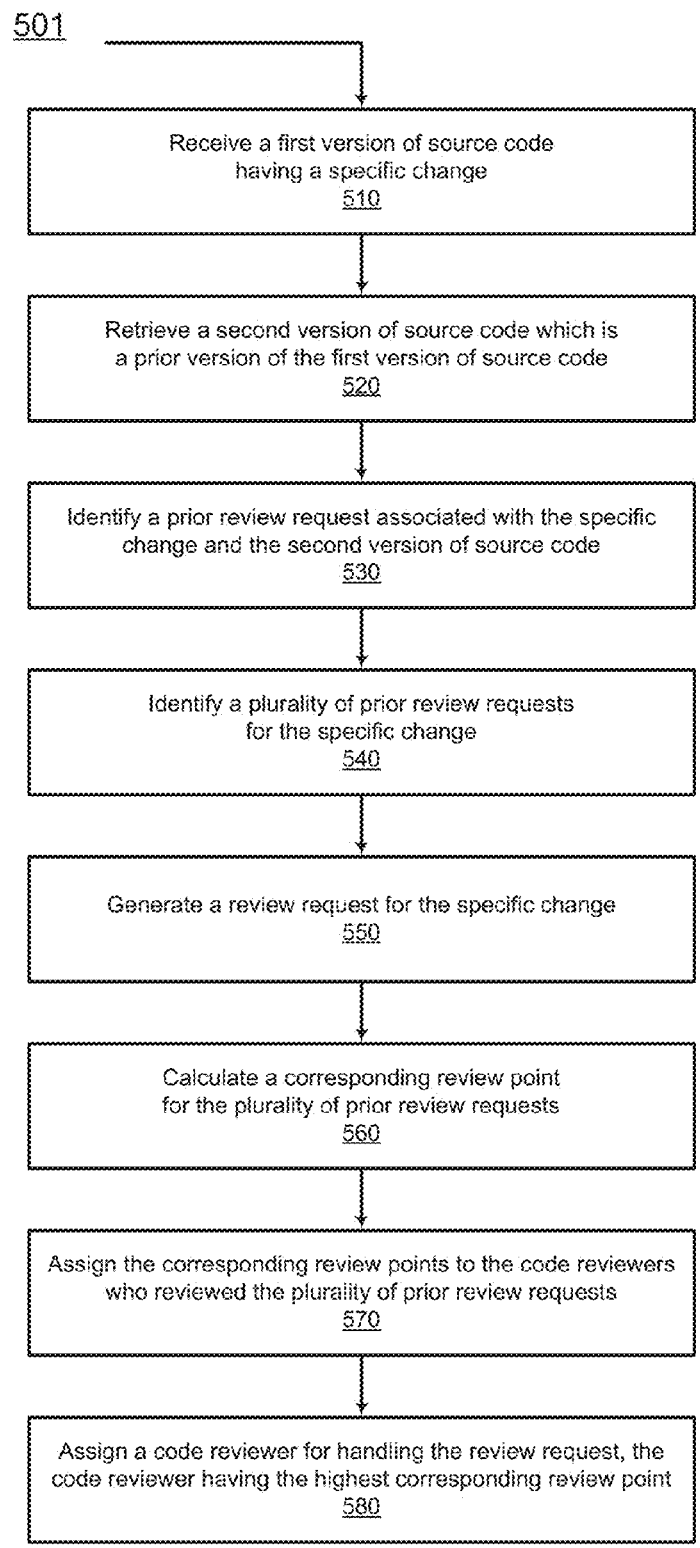
FIG. 5 shows a flow diagram illustrating one example process for managing review of source code, all arranged in accordance to at least some embodiments of the present disclosure.

FIG. 5 shows a flow diagram illustrating one example process 501 for managing review of source code, according to one embodiment of the present disclosure. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

At block 510, a software module executing on a computer system may receive a first version of source code. The software module may be a reviewer assignment module of an automatic code review system. The first version of source code may be a specific revision (e.g., revision 4) of the source code. At block 520, the software module may retrieve from a revision control system a second version of the source code. The second version of source code may be a revision of the source code that is prior to the revision of the first version of the source code. For example, the first version of source code may be revision 20, while the second version of source code may be the immediate prior revision 19, or any one of the prior revisions from 1 to 18.

At block 530, the software module may identify a prior review request associated with a specific change and the second version of source code. Specifically, the specific change may be associated with a specific location in the first version of source code and the second version of source code. The specific location may have one or more programming actions occurred in these different versions of the source code.

At block 540, the prior review request may be added to a plurality of prior review requests that are associated with the specific change. In other words, all prior review requests that involve the specific change may be added to the plurality of prior review requests. In one embodiment, upon determination that the specific change involves adding to the first version of source code, the software module may identify a prior review request based on a section of code from the first version of source code that is closest to a location of the specific change in the first version source code. In other words, a second specific change may be based on another line of code that is the closest to the specific change in the first version of source code, and the plurality of prior review requests are retrieved based on this second specific change.

At block 550, the software module may automatically generate a review request for the specific change in the first version of source code. This review request may be subsequent to the plurality of prior review requests identified at block 540 with respect to the specific change. At block 560, the software module may calculate a corresponding review point for each of the plurality of prior review requests.

At block 570, the software module may propagate the review points for the plurality of prior review requests to a plurality of code reviewers. Specifically, for a code reviewer selected from the plurality of code reviewers who have reviewed all or a subset of the plurality of review requests, the software module may assign the corresponding review points of the subset of the plurality of review requests to the specific code reviewer as his/her user point.

At block 580, the software module may select a code reviewer from the plurality of code reviewers who has the highest assigned review points, and assign this code reviewer as a recommended code reviewer for handling the review request. In other words, the code reviewer is selected from a plurality of code reviewers based on user points assigned to the plurality of code reviewers, and the review points are determined based on the plurality of code reviewers reviewing of a plurality of prior review requests associated with the specific change.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

Systems and methods for managing code review have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing review of source code, the method being performed in a system comprising a processor and a memory coupled with the processor, the method comprising:
   receiving, by a software module executing on the system, a version of source code that includes a specific change at a specific location in the version of source code that has been affected by one or more programming actions compared to a prior version of source code;
   identifying, by the software module, a plurality of prior review requests associated with the specific change, wherein each of the plurality of prior review requests affected the specific location or a section of code from the version of source code that is within a proximity of the specific location;
   assigning, by the software module, corresponding review points to each of the plurality of prior review requests, wherein the corresponding review points are assigned based on a file type of each prior review request, wherein different file types indicate different file formats, with a first format corresponding to more review points than a second format;
   aggregating the review points with respect to each of a plurality of code reviewers based on which of the plurality of code reviewers created or processed the review requests;
   selecting, by the software module, a code reviewer from the plurality of code reviewers that has the most aggregated review points; and
   generating, by the software module, a review request for the specific change in the version of source code for processing by the selected code reviewer.

2. The method as recited in claim 1, wherein the identifying the plurality of prior review requests comprises:
   identifying, by the software module, a specific prior review request associated with the specific change and the prior version of source code; and
   including the specific prior review request in the plurality of prior review requests associated with the specific change.

3. The method as recited in claim 2, wherein the identifying the specific prior review request comprises:
   upon a determination that the specific change involves adding to the version of source code, identifying the prior review request based on the section of code from the version of source code that is closest to the specific location associated with the specific change in the version source code.

4. The method as recited in claim 1, wherein the assigning the corresponding review points comprises:
   reducing the corresponding review point of the specific prior review request by a constant factor such that the corresponding review point is higher for a more recent prior review request compared to a less recent prior review request.

5. The method as recited in claim 4, wherein the selecting the code reviewer comprises:
   assigning, to a specific code reviewer from the plurality of code reviewers, the corresponding review points of the subset of the plurality of prior review requests created or processed by the specific code reviewer.

6. The method as recited in claim 5, wherein the selecting the code reviewer comprises:
   selecting one of the plurality of code reviewers that has the highest assigned review points as the code reviewer for processing the review request.

7. A non-transitory machine readable storage medium embodying computer software, the computer software causing a system to perform a method for managing review of source code, the method comprising:

receiving, by a software module, a version of source code that includes a specific change at a specific location in the version of source code that has been affected by one or more programming actions compared to a prior version of source code;

identifying, by the software module, a plurality of prior review requests associated with the specific change, wherein each of the plurality of prior review requests affected the specific location or a section of code from the version of source code that is within a proximity of the specific location;

assigning, by the software module, corresponding review points to each of the plurality of prior review requests, wherein the corresponding review points are based on a file type of each of the prior review requests, wherein different file types indicate different file formats, with a first format corresponding to more review points than a second format;

aggregating the review points with respect to each of a plurality of code reviewers based on which of the plurality of code reviewers created or processed the review requests;

selecting, by the software module, a code reviewer from the plurality of code reviewers that has the most aggregated review points; and generating, by the software module, a review request for the specific change in the version of source code for processing by the selected code reviewer.

8. The non-transitory machine readable storage medium as recited in claim 7, wherein the identifying the plurality of prior review requests comprises:

identifying, by the software module, a specific prior review request associated with the specific change and the prior version of source code; and including the specific prior review request in the plurality of prior review requests associated with the specific change.

9. The non-transitory machine readable storage medium as recited in claim 8, wherein the identifying the specific prior review request comprises:

upon a determination that the specific change involves adding to the version of source code, identifying the prior review request based on the section of code from the version of source code that is closest to the specific location associated with the specific change in the version source code.

10. The non-transitory machine readable storage medium as recited in claim 7, wherein the assigning the corresponding review points comprises:

reducing the corresponding review point of the specific prior review request by a constant factor such that the corresponding review point is higher for a more recent prior review request compared to a less recent prior review request.

11. The non-transitory machine readable storage medium as recited in claim 10, wherein the selecting the code reviewer comprises:

assigning, to a specific code reviewer from the plurality of code reviewers, the corresponding review points of the subset of the plurality of prior review requests created or processed by the specific code reviewer.

12. The non-transitory machine readable storage medium as recited in claim 11, wherein the selecting the code reviewer comprises:

selecting one of the plurality of code reviewers that has the highest assigned review points as the code reviewer for processing the review request.

13. A system configured to perform a method for managing review of source code, the system comprising a processor and a non-transitory machine readable storage medium storing instructions that, when executed by the processor, cause the processor to:

receive a version of source code that includes a specific change at a specific location in the version of source code that has been affected by one or more programming actions compared to a prior version of source code;

identify a plurality of prior review requests associated with the specific change, wherein each of the plurality of prior review requests affected the specific location or a section of code from the version of source code that is within a proximity of the specific location;

assign corresponding review points to each of the plurality of prior review requests, wherein the corresponding review points are based on a file type of each of the prior review requests, wherein different file types indicate different file formats, with a first format corresponding to more review points than a second format;

aggregate the review points with respect to each of a plurality of code reviewers based on which of the plurality of code reviewers created or processed the review requests;

select a code reviewer from a plurality of code reviewers that has the most aggregated review points; and generate a review request for the specific change in the version of source code for processing by the selected code reviewer.

14. The system as recited in claim 13, wherein the instructions for identifying the plurality of prior review requests cause the processor to:

identify a specific prior review request associated with the specific change and the prior version of source code; and include the specific prior review request in the plurality of prior review requests associated with the specific change.

15. The system as recited in claim 14, wherein the instructions for identifying the specific prior review request cause the processor to:

upon a determination that the specific change involves adding to the version of source code, identify the prior review request based on the section of code from the version of source code that is closest to the specific location associated with the specific change in the version source code.

16. The system as recited in claim 13, wherein the instructions for assigning the corresponding review points cause the processor to:

reduce the corresponding review point of the specific prior review request by a constant factor such that the corresponding review point is higher for a more recent prior review request compared to a less recent prior review request.

17. The system as recited in claim 16, wherein the instructions for selecting the code reviewer cause the processor to:

assign, to a specific code reviewer from the plurality of code reviewers, the corresponding review points of the subset of the plurality of prior review requests created or processed by the specific code reviewer.

18. The system as recited in claim 17, wherein the instructions for selecting the code reviewer cause the processor to:

select one of the plurality of code reviewers that has the highest assigned review points as the code reviewer for processing the review request.

\* \* \* \* \*